(12) United States Patent
Ahmed

(10) Patent No.: US 8,548,983 B1
(45) Date of Patent: Oct. 1, 2013

(54) TECHNIQUE OF DECORRELATION OF LATERAL VIEWS

(75) Inventor: Rafi Ahmed, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/491,391

(22) Filed: Jun. 7, 2012

(51) Int. Cl.
*G06F 17/30* (2006.01)
*G06F 7/00* (2006.01)

(52) U.S. Cl.
USPC .......................................... 707/714; 707/802

(58) Field of Classification Search
USPC .................................................. 707/714, 802
See application file for complete search history.

(56) References Cited

U.S. PATENT DOCUMENTS

| | | | |
|---|---|---|---|
| 6,615,203 B1 | 9/2003 | Lin et al. | |
| 2004/0220923 A1 | 11/2004 | Nica | |
| 2005/0097099 A1 | 5/2005 | Kapoor et al. | |
| 2006/0230017 A1 | 10/2006 | Larson et al. | |
| 2009/0019001 A1* | 1/2009 | Thiyagarajan et al. | 707/3 |
| 2009/0292669 A1* | 11/2009 | Ahmed et al. | 707/2 |
| 2011/0125696 A1* | 5/2011 | Wu et al. | 706/47 |
| 2011/0231422 A1* | 9/2011 | Rawlings et al. | 707/758 |

* cited by examiner

*Primary Examiner* — Kuen Lu
(74) *Attorney, Agent, or Firm* — Hickman Palermo Truong Becker Bingham Wong LLP

(57) ABSTRACT

Methods, computer-readable media, and machines are provided for transforming a query by removing a correlated predicate from a lateral view in an initial query. A query processor may transform the lateral view into a regular view such that a transformed query with the regular view is semantically equivalent to the initial query. The transformed query may support a larger set of access paths, join methods, and join permutations, may qualify for other transformations or optimizations, or may otherwise be executed or optimized differently from the initial query. The lateral view may reference an aggregation function, and the query processor may add a GROUP BY operator to the transformed query to preserve, after the correlated predicate has been pulled out of the lateral view, an interaction that was present between the aggregation function and the correlated predicate when the correlated predicate was in the lateral view.

32 Claims, 3 Drawing Sheets

---

RECEIVE AN INITIAL QUERY THAT JOINS DATABASE OBJECT(S) WITH A LATERAL VIEW THAT INCLUDES CORRELATED PREDICATE(S)
100

↓

TRANSFORM THE INITIAL QUERY INTO A SEMANTICALLY EQUIVALENT TRANSFORMED QUERY THAT JOINS THE DATABASE OBJECT(S) WITH A NON-LATERAL VIEW THAT DOES NOT INCLUDE THE CORRELATED PREDICATE(S)
102

↓

CAUSE EXECUTION OF THE TRANSFORMED QUERY OR A SEMANTICALLY EQUIVALENT THIRD QUERY THAT HAS BEEN TRANSFORMED BEYOND THE TRANSFORMED QUERY
104

TECHNIQUE OF DECORRELATION OF LATERAL VIEWS

CROSS-REFERENCE TO RELATED APPLICATIONS

This application is related to U.S. patent application Ser. No. 13/481,722 filed May 25, 2012 entitled, "TRANSFORMING A SINGLE-TABLE JOIN PREDICATE INTO A PSEUDO-JOIN PREDICATE," which is hereby incorporated by reference herein in its entirety.

FIELD OF THE INVENTION

The technical field relates to rewriting and optimizing queries.

BACKGROUND

Query Processing

A query is an expression, command, or set of commands that, when executed, causes a server to perform an operation on a set of data. A query may specify a join operation that combines rows from two or more sources, such as tables, views, or snapshots. In the context of database systems, a join is performed whenever multiple tables ("base or view tables") appear in a FROM clause of a query. For some join operations, the first table in the join operation may be called the "left table," and the second table in the join operation may be called the "right table." The join operation produces a result set that may be stored temporarily, used in evaluating other queries, or written as a new table in a database. The result set may often be stored temporarily so that other parts of the query may select data from the result set.

A query may be processed in a predictable order by query processors. For example, the order of precedence may be FROM, WHERE, GROUP BY, HAVING, SELECT, and ORDER BY. Query processors may vary the order if varying the order is predicted to be more efficient as long as the varying the order would not change a result of the query.

The rows on which a join operation is to be performed or the result of performing a join operation may be reduced or filtered if there are such predicates in a WHERE clause of the query. Filters in the WHERE clause may have been specified by a user who authored the query or may result from transformations performed by a query optimizer. Filters such as these that are performed separately from the join operation are called "filter predicates." Filter predicates remove rows if the rows do not satisfy the filter predicate conditions. For example, a filter predicate may remove rows for employees that are not in department 3. The conditions in the filter predicate may be related to each other with logical operators such as AND (for "conjunctive predicates") or OR (for "disjunctive predicates"). The application of filter predicates may cause certain types of results to remain in the result set, such as results that would be included for an inner join (removal of non-matching rows from the left and right tables), a left outer join (removal of non-matching rows from the right table), a right outer join (removal of non-matching rows from the left table), or a subset of the separately joined rows.

A join predicate identifies condition(s) on which a join operation is based. Join predicates are applied as the join operation is being performed rather than being applied before or after the join operation has been performed. The join predicate may be specified in an ON clause as shown in example Queries 2, 3, and 5 below or in a WHERE clause as shown in example Queries 7, 8, and 9. Unlike filter predicates, join predicates are evaluated on a row-by-row basis as the join operation is performed on the row to generate the result set. Based on whether or not the row satisfies the join predicate, the row may be included in, duplicated, excluded from, or null-padded. The evaluation of complex join predicates may be computationally expensive because join predicates are re-evaluated for each row that is joined.

In query optimization, a query optimizer or other query processor may transform queries from one form to another form as long as the two forms are semantically equivalent to each other. As used herein, a query is "transformed" when the query is (a) rewritten from a first form to a second form, (b) received in a manner that specifies a first set of operations, such as a first form or a first execution plan, and executed using a second set of operations, such as the operations specified by a second form or second execution plan, or (c) received in a manner that specifies a first set of operations, and planned for execution using a second set of operations. An execution plan is information, such as a query tree structure, that is prepared for an execution engine. Two queries or execution plans are semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by the query or execution plan, if executed.

Join Operations

The manner in which tables are joined can affect the outcome of the query. Example types of join operations include inner join, left outer join, right outer join, full outer join, natural join, and cross join. Example methods of join include hash, sort-merge, index access, and nested-loops joins. The method used for joining two table does not affect the outcome of the query. The type of join operation may be specified in the FROM clause or in the WHERE clause of the query. The method of join is generally left up to the query optimizer to determine, for example, based on a cost-analysis of the methods available for the query.

A cross-join produces a result set that is a Cartesian product of all rows in the sources. In other words, for a cross-join of T1 and T2, every row in source table T1 would be combined with every row of source table T2. Computing the Cartesian product is an expensive operation that uses an order of n*m resources to compute, where n is the number of rows in table T1 and m is the number of rows in table T2.

If the specified type of join is not a cross-join, computation of the join operation may avoid the complex computation of a Cartesian product of all rows in the sources. Many database systems support American National Standards Institute ("ANSI") syntax for specifying types of joins that are performed on the tables. Different types of joins often produce different result sets by including, duplicating, excluding, or null-padding different sets of rows from the sources. A row is said to be "null-padded" if values in the row are changed to null. A row may be null-padded if the row is included in the result set even though the row does not satisfy a join predicate.

For example, an inner join produces a result set that includes only the matching rows (i.e., the rows that satisfy the predicate). An example syntax for an inner join is provided in Query 1 below.

Query 1: Example Syntax for an Inner Join
SELECT T1.SSN, T1.name, T2.dname

FROM T1, T2
WHERE T1.dno=T2.1d;

For inner joins such as this one, the predicate in the WHERE clause may be treated as either a join predicate or a filter predicate—the placement of the predicate does not change the result set. The optimizer may choose to evaluate this query by applying the predicate as part of the join operation or separately from the join operation as a filter predicate on the result of the Cartesian product of the two tables. The join predicate in this example produces the results shown in Table 1, where rows from T1 are said to match rows from T2 if the value of the department number ("dno") column in T1 matches the value of the "id" column in T2. If the rows match, the values for that row from T1 and for that row from T2 are added to the result set.

TABLE 1

ROWS RESULTING FROM AN EXAMPLE INNER JOIN

| COLUMN(S) FROM T1 | COLUMN(S) FROM T2 |
| --- | --- |
| ROWS FROM T1 AND T2 THAT MATCH | |

Query 2 uses the ANSI syntax "INNER JOIN" to signal the inner join, but Query 2 is semantically equivalent to Query 1—the two queries, if executed, would produce the same result set that is shown in Table 1.

Query 2: Example Syntax for the Inner Join
SELECT T1.SSN, T1.name, T2.dname
FROM T1 INNER JOIN T2
ON T1.dno=T2.1d;

A full-outer join is one type of outer join. The full-outer join produces a result set that includes matching rows and null-padded non-matching rows. In other words, rows that do not satisfy the predicate are null-padded rather than excluded altogether. An example syntax for a full outer join is provided in Query 3 below.

Query 3: Example Syntax for a Full Outer Join
SELECT T1.SSN, T1.name, T2.dname
FROM T1 FULL OUTER JOIN T2
ON (T1.dno=T2.1d);

Query 3 is not equivalent to Query 1 or Query 2. In Query 3, the "FULL OUTER JOIN" operator signals that the join operation is a full outer join. The join predicate in this example produces the results shown in Table 2, where rows from T1 are said to match rows from T2 if the value of the department number ("dno") column in T1 matches the value of the "id" column in T2. If the rows match, the values from the SSN and name columns for that row from T1 and the department name ("dname") column for that row from T2 are added to the result set. Rows from T1 that do not have a matching row in T2 are also added to the result set, except that the column(s) from T2, such as "dname" in the example, are null-padded for those rows. Similarly, rows from T2 that do not have a matching row in T1 are added to the result set, except that column(s) from T1, such as "SSN" and "name" in the example, are null-padded for those rows. Unlike inner joins, rows from T1 that do not have a matching row in T2 are added to the result set as null-appended rows. Also unlike inner joins, rows from T2 that do not have a matching row in T1 are added to the result set as null-appended rows.

TABLE 2

ROWS RESULTING FROM AN EXAMPLE FULL OUTER JOIN

| COLUMN(S) FROM T1 | COLUMN(S) FROM T2 |
| --- | --- |
| ROWS FROM T1 THAT DO NOT MATCH T2 | NULL VALUES |
| ROWS FROM T1 AND T2 THAT MATCH | |
| NULL VALUES | ROWS FROM T2 THAT DO NOT MATCH T1 |

A left outer join is another type of outer join. The left outer join produces a result set that includes matching rows and null-padded non-matching rows for the left table but not for the right table. In other words, rows from the left table that do not satisfy the join predicate are null-padded; whereas, rows that do not satisfy the predicate in the right table are excluded. An example syntax for a Oracle native left outer join is provided in Query 4 below, where the left outer join is signaled by the native Oracle operator, "(+)".

Query 4: Example Syntax for a Left Outer Join
SELECT T1.SSN, T1.name, T2.dname
FROM T1, T2 WHERE T1.dno=T2.1d (+)

Query 4 is not semantically equivalent to any of Queries 1-3. The join predicate in this example produces the results shown in Table 3, where rows from T1 are said to match rows from T2 if the value of the department number ("dno") column in T1 matches the value of the "id" column in T2. If the rows match, the values for that row from T1 and for that row from T2 are added to the result set. Rows from T1 that do not have a matching row in T2 are also added to the result set, except that the column(s) from T2, such as "dname" in the example, are null-padded for those rows. Unlike a full outer join, rows from T2 that do not have a matching row in T1 are not added to the result set.

TABLE 3

ROWS RESULTING FROM AN EXAMPLE LEFT OUTER JOIN

| COLUMN(S) FROM T1 | COLUMN(S) FROM T2 |
| --- | --- |
| ROWS FROM T1 THAT DO NOT MATCH T2 | NULL VALUES |
| ROWS FROM T1 AND T2 THAT MATCH | |

Query 5 uses the ANSI syntax for "LEFT OUTER JOIN" to signal the left outer join, but Query 5 is semantically equivalent to Query 4—the two queries, if executed, would produce the same result set that is shown in Table 3. Queries 4 and 5 are not semantically equivalent to Queries 1-3.

Query 5: Example Syntax for the Left Outer Join
SELECT T1.5SN, T1.name, T2.dname
FROM T1 LEFT OUTER JOIN T2
ON T1.dno=T2.1d;

Views

A view is a database object that is defined by an expression that references other database objects. A view may be looked upon as a predefined or inline query. The view may be an in-line view that is defined by a sub-query that is nested within another query. Query 6 is an example query with an in-line view.

Query 6: Example Query with an in-Line View
SELECT V1.x
FROM (SELECT T1.x AS x FROM T1 WHERE T1.y>5) V1;

Alternatively, the view may be an external view that is defined outside of the query. Query 7 is an example query with an external view.

Query 7: Example Query with an External View
CREATE VIEW V1 AS SELECT T1.x AS x FROM T1 WHERE T1.y>5,
SELECT V1.x FROM V1;

Lateral Views

A lateral view is an inline view (a view defined in the query itself) that references other table(s) that precede the lateral view in the FROM clause. The lateral view is said to be "correlated" with other table(s) because the lateral view includes predicate(s) that reference the other table(s) that precede the lateral view in the FROM clause. These other tables may be referred to herein as "sibling table(s)."

Query 8 is an example query with a lateral view. In the example, the correlated predicate, "T1.y>5", references a table T1 that precedes the lateral view in the FROM clause.

Query 8: Example Query with a Lateral View
SELECT V1.x
FROM T1, LATERAL VIEW (SELECT T2.x AS x FROM T2 WHERE T1.y>5 AND T2.z>5)
LV1;

The lateral view may occur in the query as a result of a user writing the query to include the lateral view as part of ANSI SQL syntax, or as a result of a query transformation. For example, Oracle® queries using ANSI full outerjoin and left or right outer join syntax may internally generate lateral views. These lateral views often appear as a left outer-joined table.

Lateral views often contain complex correlating join conditions, contain aggregation, or are left-outer joined and contain multiple tables. These lateral views are not mergeable and are executed using the nested-loop join method. Other join methods such as hash and sort-merge cannot be used for joining lateral views. The nested-loop join method is executed using two nested loops. For a nested-loop join of example tables T1 and T2, an outer loop of the join operation may iterate on records of T1, and an inner loop of the join operation may iterate on records of T2. Computing a nested loop join uses an order of n*m resources to compute, where n is the number of rows in table T1 and m is the number of rows in table T2. Also, an unmerged lateral view cannot use a native join operator such as "(+)"; thus, a query containing an unmerged lateral view is executed using nested-loop join method that is often effectively equivalent to the computationally expensive cross join operation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
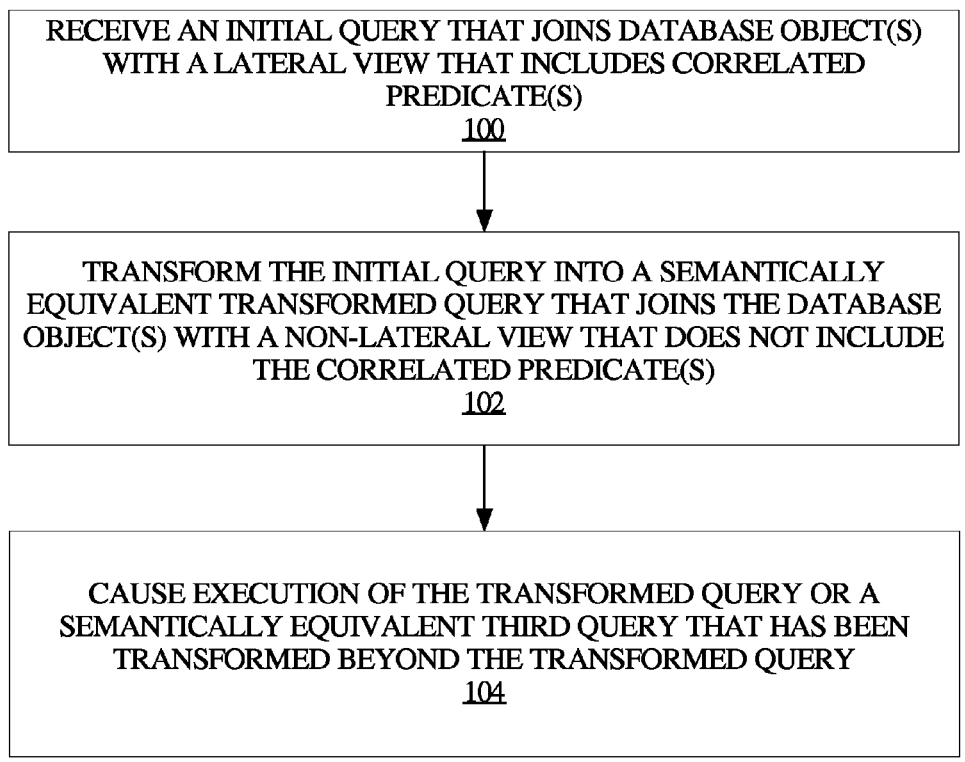
FIG. 1 illustrates an example process for transforming a query by removing correlated predicate(s) from a lateral view.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for transforming a query by removing correlated predicate(s) from a lateral view in an initial query. A query optimizer or other query processor may transform the lateral view into a regular (i.e., non-correlated and non-lateral) view, referred to herein as a "de-correlated view," such that a transformed query with the de-correlated view is semantically equivalent to the initial query with the lateral view. For the transformed query with the de-correlated view, the query processor may choose from a much larger set of access paths, join methods, and join permutations. For example, the query processor may choose join methods other than the nested loops join method. The transformed query with the de-correlated view may also qualify for other transformations or optimizations, or may otherwise be executed or optimized differently from the initial query with the correlated lateral view.

In one embodiment, the query processor de-correlates an outer joined lateral view in an initial query by pulling correlated predicate(s) out of the outer joined lateral view. The outer joined lateral view is transformed into a regular outer joined view, and the previously correlated predicate(s) are moved to a WHERE clause that is outside of the regular outer joined view in a transformed query. In the initial query, the correlated predicate(s) referenced sibling table(s) that appeared before the lateral view in the FROM clause. The correlated predicate(s) may have also referenced table(s) that were joined in the lateral view. In the transformed query, the previously correlated predicate(s) are transformed into non-correlated predicate(s) that reference the outer joined view instead of the table(s) that were joined in the lateral view. The transformed predicate(s) also reference an outer join operation. For example, a native outer join operator may be applied to the transformed predicate(s) to preserve the outer joined nature that was present in the outer joined lateral view.

In one embodiment, an initial query inner joins a database object and a lateral view that contains an aggregate function, such as, MAX, MIN, AVG, COUNT, SUM, AVG(DISTINCT), SUM(DISTINCT), COUNT(DISTINCT), and COUNT(*). A query processor transforms the initial query by adding a GROUP BY clause to the view, and by transforming the non-outer joined lateral view into a regular (i.e., non-lateral) outer joined view. The GROUP BY clause references the local columns that previously appeared in a correlated predicate of the lateral view. The addition of the GROUP BY clause in an outer joined view simulates, when the transformed predicate is applied to the outer joined view, the correlation that was present in the lateral view of the initial query. In other words, the GROUP BY clause preserves, after the correlated predicate(s) have been pulled out of the lateral view, an interaction that was present between the aggregation function and the correlated predicate(s) when the correlated predicate(s) were in the lateral view. Whether or not there is an aggregate function in the initial query, the correlated predicate(s) may be moved to a WHERE clause, and the correlated predicate(s) may be transformed into transformed predicate(s) that reference the regular outer joined view and an outer join operation. The semantic equivalence of the initial query and the transformed query is maintained even when the initial query contains the aggregate function. In one embodiment, the GROUP BY clause is added even if the initial query already includes a GROUP BY clause.

Also, this de-correlation technique is effective even if the initial query includes an outer joined lateral view that references an aggregation function. If the initial query includes the outer joined lateral view that references the aggregation function, this outer joined lateral view may be transformed into a regular outer joined view that includes a GROUP BY clause that references the local columns that previously appeared in a correlated predicate of the lateral view.

In one embodiment, a query processor, implemented on computing device(s), transforms an initial query to a transformed query. The initial query includes a lateral view, and the lateral view includes a predicate that references a database object that is joined with the lateral view. For example, the referenced database object may be a sibling table that appears before the lateral view in the FROM clause of the initial query. The sibling table might be outer joined with the lateral view. The transformed query includes a transformed view without the predicate that references the database object. In the transformed query, the database object is joined with the transformed view instead of the lateral view. The transformed view in the transformed query corresponds to the lateral view in the initial query, but the transformed view may support a wider variety of query execution techniques because the transformed view does not contain the predicate that references the database object. The transformed query also includes a transformed predicate outside the transformed view. The transformed predicate corresponds to the predicate that referenced the database object, but the transformed predicate now also references the transformed view. The transformed predicate may also reference an outer join operation. The transformed query is semantically equivalent to the initial query.

In the initial query, the database object may be left outer joined with the lateral view that includes a predicate that references the database object. Similarly, in the transformed query, the database object may be left outer joined with the transformed view, but the transformed view might no longer contain the predicate that references the database object.

The lateral view in the initial query may include multiple correlated predicates. In other words, multiple predicates in the lateral view may reference database object(s) that appear before the lateral view in the FROM clause. One, some, or all of the multiple predicates may be pulled out of the lateral view when the query is transformed. For example, two or more of the predicates may be pulled out of the lateral view by placing the predicates in the WHERE clause of the transformed query, replacing references to sibling table(s) with references to the transformed view, and by adding references to an outer join operation. The transformed query may or may not include any references to any database objects that are outside the transformed view. In other words, the transformed query may or may not include any remaining correlated predicates.

The transformed query, if executed, may cause a temporary organization of data from the database object and the transformed view and utilization of the temporary organization of data for evaluation of multiple rows of the outer join between the database object and the transformed view. For example, the temporary organization of data may include a temporarily stored sorted version of the database object or the transformed view. As another example, the temporary organization of data may include a temporarily stored hash table that maps entries of the database object or the transformed view to hash buckets. These temporary organizations of data may be created when the query is received or during query processing, and the temporary organizations of data may be discarded once the query is completed. The temporary organizations of data may also be preserved for use in executing other queries. Because of the correlated predicates in the lateral view of the initial query, such temporary organizations might not be possible to use for processing the initial query.

In one embodiment, the query processor receives the initial query for execution or for optimization and then execution. In response to receiving the initial query, the query processor generates an execution plan for executing the transformed query instead of the initial query. In the same or another embodiment, in response to receiving the initial query, the query processor executes or causes execution of the transformed query instead of the initial query.

The techniques may be implemented as steps that are performed by computing device(s). The computing device(s) may be specially configured to perform the steps, for example, by including specialized hardware and/or specialized software. Alternatively, one or more non-transitory computer-readable media may store specialized instructions for causing computing device(s) to perform the steps.

FIG. 1 illustrates an example process for transforming a query by removing correlated predicate(s) from a lateral view. The process may be carried out by computing device(s) that are specially configured to perform the steps. In the example, a first query is received in step 100. The first query joins database object(s) with a lateral view that includes correlated predicate(s). In step 102, the first query is transformed into a semantically equivalent transformed query that joins the database object(s) with a non-lateral view that does not include the correlated predicate(s). In step 104, execution is caused for the transformed query or for a semantically equivalent third query that has been transformed beyond the transformed query.

Figure 2:
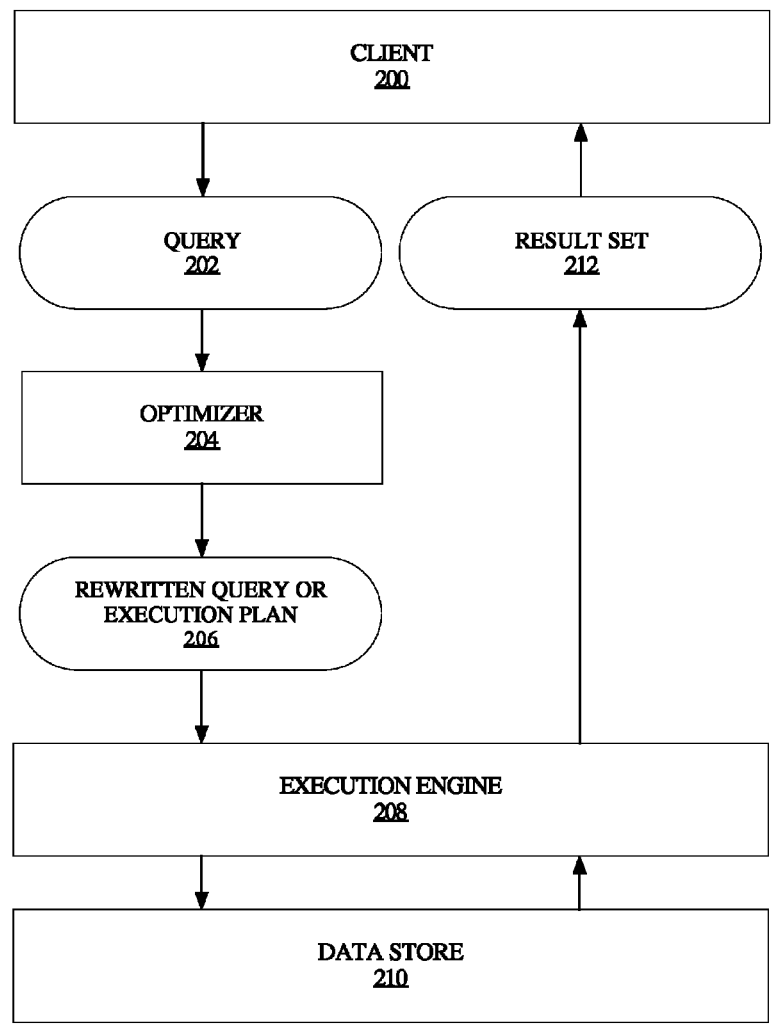
FIG. 2 illustrates an example server-client system for transforming and executing a query.

FIG. 2 illustrates an example server-client system for transforming and executing a query. In the example, client 200 sends a query 202 to optimizer 204. As shown, optimizer 204 is separate from execution engine 208. Optimizer 204 and execution engine 208 may operate on same or different devices and may have a high amount or low amount of integration with each other. Optimizer 204 rewrites the query or generates an execution plan that is based on the query or a transformation of the query. Optimizer sends the rewritten query or execution plan 206 to execution engine 208. Execution engine 208 then executes the rewritten query or execution plan 206 against data store 210 and returns result set 212 to client 200.

Example De-Correlation of a Lateral View

High-level concepts have been described for transforming a query by removing correlated predicate(s) from a lateral view. Specific examples are provided herein to reinforce and deepen an understanding of these high-level concepts. However, the high-level concepts are not limited by these specific examples.

A query such as Query 9 may be received for execution.

Query 9: Example Query Received for Execution

```
SELECT T1.a, T2.b, LV.y
FROM T1, T2,
    LATERAL VIEW (SELECT T3.y
        FROM T3, T4
        WHERE T3.z = T4.z AND T3.k > 2 AND
            T4.w = T1.w AND T3.c = T2.c) LV (+)
WHERE T1.x = T2.x;
```

Query 9 includes an outer joined lateral view that joins two tables, T3 and T4. Although the example involves two tables, any number of tables may be joined in the lateral view. The outer joined lateral view references two other tables, T1 and T2, that appear before the lateral view in the FROM clause of Query 9. The correlated predicates in the lateral view are "T4.w=T1.w" and "T3.c=T2.c", because these predicates reference the sibling tables T1 and T2. "T3.z=T4.z" is a join predicate between the local tables T3 and T4, and "T3.k>2" is a local filter predicate. The outer joined lateral view on the two or more tables cannot be merged because the join order is imposed. In the example, T3 and T4 are inner joined (FROM T3, T4) before the result is outer joined with the outside tables. If there are two or more tables in the lateral view, which is common, then the inner join in the lateral view would be performed first. Without further transformation of the query, the query with correlated tables in the lateral view would be executed with the lateral view and correlation intact and with the imposed join ordering restraints.

A query processor may decorrelate the correlated predicates in the lateral view of Query 9 to generate transformed Query 10.

Query 10: Example Transformed Query
SELECT T1.a, T2.b, DV.y
FROM T1, T2,
   (SELECT T3.y AS y, T4.w AS w, T3.c AS c
   FROM T3, T4
   WHERE T3.z=T4.z AND T3.k>2) DV
WHERE T1.x=T2.x AND T1.w=DV.w (+) AND T2.c=DV.c (+);

Transformed Query 10 includes a new inline view, DV. The new inline view is still outer joined, but the previously correlated predicates now appear explicitly in the outer query. The correlated predicates from Query 9 were pulled out of the lateral view to create transformed predicates "T1.w=DV.w (+)" and "T2.c=DV.c(+)". The transformed predicates now reference a regular outer joined view, DV. The columns of DV, "w" and "c", are explicitly defined in the SELECT clause to support references to these columns by the transformed predicates. The transformed predicates also reference an outer join operation, signaled by the Oracle native outer join operator, "(+)". Other indications or techniques may also be used by a server to signal or reference an outer join operation. The regular outer joined view can be joined by hash join, sort merge join, or nested loop join. The additional join methods are available because the correlation is no longer present in the view.

Example Query 9 could also include a correlated filter predicate. If the initial query includes a correlated filter predicate, the correlated filter predicate may be transformed into a pseudo-join predicate according to the techniques described in the U.S. patent application entitled, "TRANSFORMING A SINGLE-TABLE JOIN PREDICATE INTO A PSEUDO-JOIN PREDICATE," with Ser. No. 13/481,722, which has been incorporated by reference herein in its entirety. The techniques in this application and the application with Ser. No. 13/481,722 are complimentary because the techniques may be applied separately or together as part of a complex query transformation.

In another example, a query such as Query 11 may be received for execution. Query 11 includes a reference to an aggregation function inside a lateral view that is not outer joined.

Query 11: Example Query Received for Execution
SELECT T1.a, T1.b, V.sy
FROM T1,
   LATERAL (SELECT SUM(T3.y) sy
   FROM T3
   WHERE T3.k>2 AND T3.w=T1.w) LV;

In Query 11, the lateral view is not outer joined and does not contain a GROUP BY clause. Query 11 does include the correlated predicate, "T3.w=T1.w" and the reference to the aggregate function, "SUM(T3.y)". Lateral views may have one or more aggregation functions and one or more tables. Even though this aggregation predicate, "SUM(T3.y)," is a single-table predicate, the lateral view still has aggregation and cannot be merged.

Query 11 may be transformed into transformed Query 12 that includes a de-correlated outer-joined regular view that contains a GROUP BY clause.

Query 12: Example Transformed Query
SELECT T1.a, T1.b, DV.sy
FROM T1, (SELECT SUM(T3.y) AS sy, T3.w AS w
   FROM T3
   WHERE T3.k>2
   GROUP BY T3.w) DV
WHERE T1.w=DV.w (+);

The GROUP BY clause added to Query 12 references the local columns (here, "T3.w") that appeared in the correlated predicate (here, "T3.w=T1.w") of the lateral view. The GROUP BY clause introduced during de-correlation simulates the lateral view correlation in computing the aggregate function. The GROUP BY clause assimilates the correlation because, for each group, the sum is being computed. The left outer join is introduced to force the query to return a row even when the GROUP BY view would otherwise produce 0 rows. For example, an aggregate function applied to 0 rows would return 1 row, but that aggregate function applied to a GROUP BY query with 0 rows would return 0 rows. The left outer join is added to the transformed query in order to preserve semantic equivalence between the queries and to force the transformed query to return a row even when the GROUP BY clause otherwise would produce 0 rows.

In Query 12, the correlated predicate, "T3.w=T1.w" was also pulled out of the lateral view and pushed into the WHERE clause. The correlated predicate in Query 12 references the outer joined view, "DV (+)". Query 11 may be de-correlated using this technique even if Query 11 included a lateral view that is outer-joined and/or had a pre-existing GROUP BY clause.

Query 11 took the sum of all the values in the lateral view for that correlation. In Query 12, the view is de-correlated, but the grouping is accomplished on the column on which the view is joined (here, "T3.w"). The transformed query, when executed, produces groups of rows on the column and then causes a join on the value of the grouping column. The sum occurs for each of the groups, thereby assimilating the correlation. For example, one group may have ten rows with same value for a column, and another group may have eleven rows with the same value for a column. With GROUP BY, the sum is computed for all of the groups before the join is performed, rather than performing the join before the sum is computed as would be done without the GROUP BY. The result is the same, and thus Query 12 is semantically equivalent to Query 11.

Join Methods

A query optimizer may choose from among different available join methods to carry out a join operation. As described herein, some join methods are not available to some query formulations.

In a nested loops join method, a join operation is evaluated on a row-by row basis. In other words, during a join of T1 and T2, for each row of T1, the execution engine would scan T2 to determine whether T2 satisfies a join condition for that row.

In an index access join method, the execution engine may utilize indexes that existed in a database before the query was received. For example, the database may already include indexes on the columns of T1 and/or T2 that are relevant to the join conditions. The execution engine leverages the index but still looks for these values on a row-by-row basis.

In a sort-merge join method, the execution engine may initially sort data in both of the tables that are being joined. The sorted data may be retained during execution of the query such that the sorted data does not need to be regenerated for each row. The sorted data may also be destroyed or retained once the query has been executed. For example, if evaluating an equality condition such as T1.dno=T2.1d for a first row of T1 where T1.dno=5, the execution engine may look in the sorted data for T2.1d=5. If the execution engine starts at a value below T2.1d=5, the execution may save time by stopping the search once the execution engine reaches a value that is greater than T2.1d=5. Similarly, if the execution engine starts at a value above T2.1d=5, the execution engine may save time by stopping the search once the execution engine reaches a value that is less than T2.1d=5.

In a hash join method, the execution engine may initially create a hash table that hashes values of either T1 into a hash bucket or values of T2 into a hash bucket. The hash tables may be retained during execution of the query such that the hash tables do not need to be regenerated for each row. The hash tables may also be destroyed or retained once the query has been executed. For example, if evaluating an equality condition such as T1.dno=T2.1d for a first row of T1 where T1.dno=5, the execution engine may use a hash table to map T1.dno=5 to hash bucket X. For T2.1d=5, the execution engine may be directed to look in the already existing hash bucket X, which may be significantly smaller than T2.

The sort-merge join method and the hash join method both involve a temporary organization of data from the first database object and the second database object, and utilization of the temporary organization of data for evaluation of multiple rows of the join operation. The temporary organization of data may involve the creation of a temporary database object such as a sorted table or a hash table. The temporary database object may be destroyed or retained after the join operation is completed. The nested loops and index access join methods do not create such data during query execution and cannot leverage such data to improve query execution.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
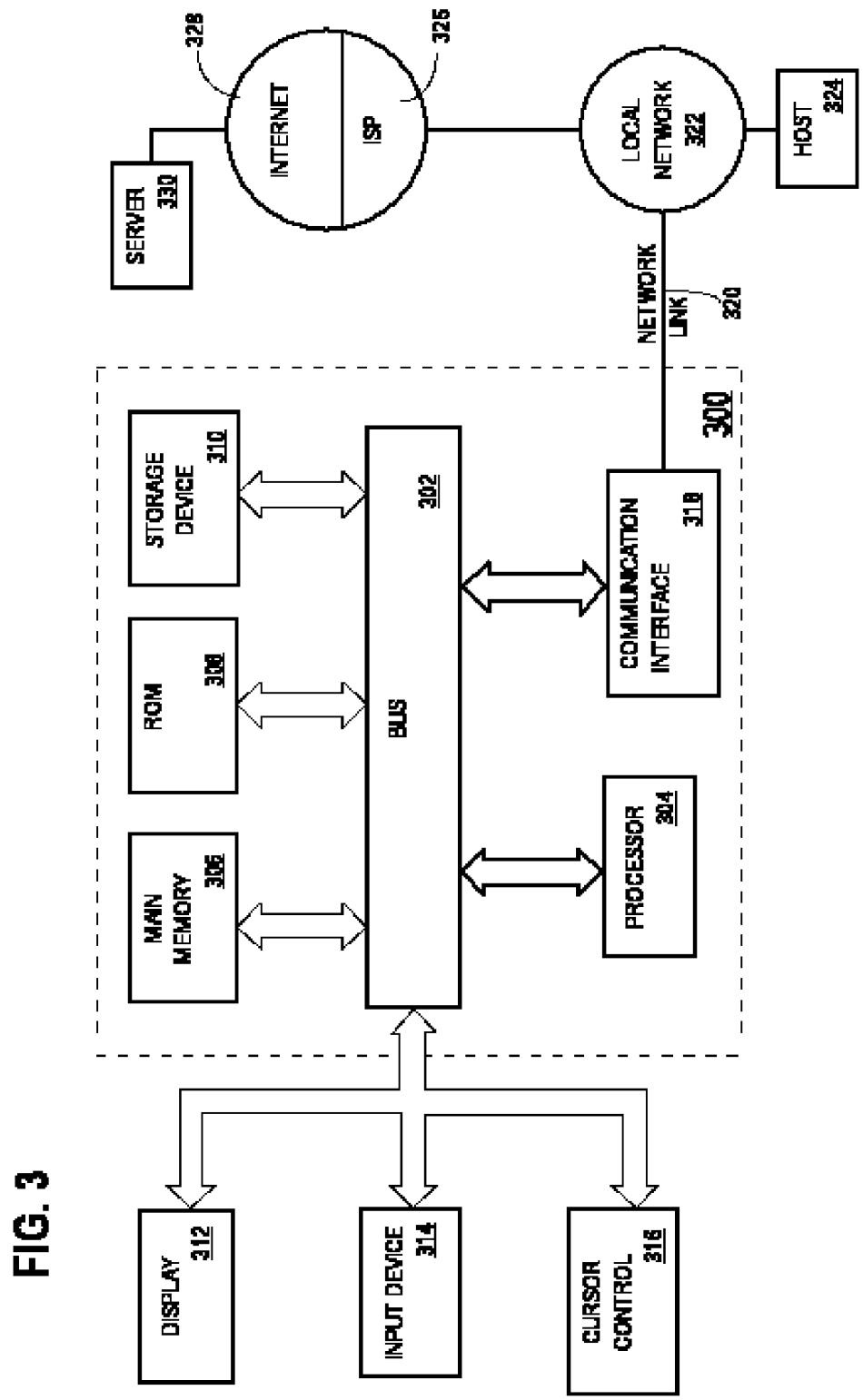
FIG. 3 illustrates an example computer system for performing various combinations of steps described herein.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    transforming a first query, comprising a first lateral view that includes a first predicate that references a database object that is joined with the first lateral view, to a second query that includes:
    a second view without the first predicate that references the database object, wherein the database object is joined with the second view, and
    a second predicate outside the second view, wherein the second predicate corresponds to the first predicate, wherein the second predicate references the second view, and wherein the second query is semantically equivalent to the first query;
    causing execution of the second query instead of the first query;
    wherein the method is performed by one or more computing devices.

2. The method of claim 1, wherein the first query comprises a left outer join of the database object and the first lateral view, and wherein the second query comprises a left outer join of the database object and the second view.

3. The method of claim 1, wherein the second predicate references both the database object and the second view.

4. The method of claim 1, wherein the first lateral view includes a plurality of correlated predicates, including the first predicate, and wherein the second view does not include any of the correlated predicates.

5. The method of claim 1, wherein the first lateral view is an outer joined or a non-outer joined lateral view that references an aggregation function, wherein the second view is an outer joined non-lateral view, and wherein the second view includes a GROUP BY clause that preserves, after the first predicate has been pulled out of the first lateral view, an interaction that was present between the aggregation function and the first predicate when the first predicate was in the first lateral view.

6. The method of claim 1, wherein the second predicate references an outer join operation.

7. The method of claim 1, wherein a first set of two or more predicates in the first lateral view reference one or more database objects that are not in the first lateral view, and wherein the second query includes a second set of two or more predicates outside the second view, wherein the second set of two or more predicates correspond to the first set of two or more predicates, and wherein the second set of two or more predicates reference the second view.

8. The method of claim 1, wherein the second query, if executed, would cause a temporary organization of data from the database object and the second view and utilization of the temporary organization of data for evaluation of multiple rows of the outer join.

9. One or more non-transitory computer-readable storage media storing instructions which, when executed by one or more computing devices, cause:
    transforming a first query, comprising a first lateral view that includes a first predicate that references a database object that is joined with the first lateral view, to a second query that includes:
    a second view without the first predicate that references the database object, wherein the database object is joined with the second view, and
    a second predicate outside the second view, wherein the second predicate corresponds to the first predicate, wherein the second predicate references the second view, and wherein the second query is semantically equivalent to the first query;
causing execution of the second query instead of the first query;
wherein the method is performed by one or more computing devices.

10. The one or more non-transitory computer-readable storage media of claim 9, wherein the first query comprises a left outer join of the database object and the first lateral view, and wherein the second query comprises a left outer join of the database object and the second view.

11. The one or more non-transitory computer-readable storage media of claim 9, wherein the second predicate references both the database object and the second view.

12. The one or more non-transitory computer-readable storage media of claim 9, wherein the first lateral view includes a plurality of correlated predicates, including the first predicate, and wherein the second view does not include any of the correlated predicates.

13. The one or more non-transitory computer-readable storage media of claim 9, wherein the first lateral view is an outer joined or a non-outer joined lateral view that references an aggregation function, wherein the second view is an outer joined non-lateral view, and wherein the second view includes a GROUP BY clause that preserves, after the first predicate has been pulled out of the first lateral view, an interaction that was present between the aggregation function and the first predicate when the first predicate was in the first lateral view.

14. The one or more non-transitory computer-readable storage media of claim 9, wherein the second predicate references an outer join operation.

15. The one or more non-transitory computer-readable storage media of claim 9, wherein a first set of two or more predicates in the first lateral view reference one or more database objects that are not in the first lateral view, and wherein the second query includes a second set of two or more predicates outside the second view, wherein the second set of two or more predicates correspond to the first set of two or more predicates, and wherein the second set of two or more predicates reference the second view.

16. The one or more non-transitory computer-readable storage media of claim 9, wherein the second query, if executed, would cause a temporary organization of data from the database object and the second view and utilization of the temporary organization of data for evaluation of multiple rows of the outer join.

17. A method comprising:
transforming a first query, comprising a first lateral view that includes a first predicate that references a database object that is joined with the first lateral view, to a second query that includes:
a second view without the first predicate that references the database object, wherein the database object is joined with the second view, and
a second predicate outside the second view, wherein the second predicate corresponds to the first predicate, wherein the second predicate references the second view, and wherein the second query is semantically equivalent to the first query;
generating an execution plan for executing the second query instead of the first query;
wherein the method is performed by one or more computing devices.

18. The method of claim 17, wherein the first query comprises a left outer join of the database object and the first lateral view, and wherein the second query comprises a left outer join of the database object and the second view.

19. The method of claim 17, wherein the second predicate references both the database object and the second view.

20. The method of claim 1, wherein the first lateral view includes a plurality of correlated predicates, including the first predicate, and wherein the second view does not include any of the correlated predicates.

21. The method of claim 17, wherein the first lateral view is an outer joined or a non-outer joined lateral view that references an aggregation function, wherein the second view is an outer joined non-lateral view, and wherein the second view includes a GROUP BY clause that preserves, after the first predicate has been pulled out of the first lateral view, an interaction that was present between the aggregation function and the first predicate when the first predicate was in the first lateral view.

22. The method of claim 17, wherein the second predicate references an outer join operation.

23. The method of claim 17, wherein a first set of two or more predicates in the first lateral view reference one or more database objects that are not in the first lateral view, and wherein the second query includes a second set of two or more predicates outside the second view, wherein the second set of two or more predicates correspond to the first set of two or more predicates, and wherein the second set of two or more predicates reference the second view.

24. The method of claim 17, wherein the second query, if executed, would cause a temporary organization of data from the database object and the second view and utilization of the temporary organization of data for evaluation of multiple rows of the outer join.

25. One or more non-transitory computer-readable storage media storing instructions which, when executed by one or more computing devices, cause:
transforming a first query, comprising a first lateral view that includes a first predicate that references a database object that is joined with the first lateral view, to a second query that includes:
a second view without the first predicate that references the database object, wherein the database object is joined with the second view, and
a second predicate outside the second view, wherein the second predicate corresponds to the first predicate, wherein the second predicate references the second view, and wherein the second query is semantically equivalent to the first query;
generating an execution plan for executing the second query instead of the first query;
wherein the method is performed by one or more computing devices.

26. The one or more non-transitory computer-readable storage media of claim 25, wherein the first query comprises a left outer join of the database object and the first lateral view, and wherein the second query comprises a left outer join of the database object and the second view.

27. The one or more non-transitory computer-readable storage media of claim 25, wherein the second predicate references both the database object and the second view.

28. The one or more non-transitory computer-readable storage media of claim 25, wherein the first lateral view includes a plurality of correlated predicates, including the first predicate, and wherein the second view does not include any of the correlated predicates.

29. The one or more non-transitory computer-readable storage media of claim 25, wherein the first lateral view is an outer joined or a non-outer joined lateral view that references an aggregation function, wherein the second view is an outer joined non-lateral view, and wherein the second view includes a GROUP BY clause that preserves, after the first predicate has been pulled out of the first lateral view, an interaction that was present between the aggregation function and the first predicate when the first predicate was in the first lateral view.

30. The one or more non-transitory computer-readable storage media of claim 25, wherein the second predicate references an outer join operation.

31. The one or more non-transitory computer-readable storage media of claim 25, wherein a first set of two or more predicates in the first lateral view reference one or more database objects that are not in the first lateral view, and wherein the second query includes a second set of two or more predicates outside the second view, wherein the second set of two or more predicates correspond to the first set of two or more predicates, and wherein the second set of two or more predicates reference the second view.

32. The one or more non-transitory computer-readable storage media of claim 25, wherein the second query, if executed, would cause a temporary organization of data from the database object and the second view and utilization of the temporary organization of data for evaluation of multiple rows of the outer join.

* * * * *

UNITED STATES PATENT AND TRADEMARK OFFICE
CERTIFICATE OF CORRECTION

PATENT NO. : 8,548,983 B1  
APPLICATION NO. : 13/491391  
DATED : October 1, 2013  
INVENTOR(S) : Ahmed Page 1 of 1

It is certified that error appears in the above-identified patent and that said Letters Patent is hereby corrected as shown below:

In the Specification

In column 3, line 2, delete "T1.dno=T2.1d;" and insert -- T1.dno=T2.id; --, therefor.

In column 3, line 35, delete "T1.dno=T2.1d;" and insert -- T1.dno=T2.id; --, therefor.

In column 3, line 46, delete "(T1.dno=T2.1d);" and insert -- (T1.dno=T2.id); --, therefor.

In column 4, line 23, delete "T1.dno=T2.1d" and insert -- T1.dno=T2.id --, therefor.

In column 4, line 53, delete "T1.5SN," and insert -- T1.SSN, --, therefor.

In column 4, line 55, delete "T1.dno=T2.1d;" and insert -- T1.dno=T2.id; --, therefor.

In column 5, line 6, delete "T1.y>5," and insert -- T1.y>5; --, therefor.

In column 11, line 13, delete "T1.dno=T2.1d" and insert -- T1.dno=T2.id --, therefor.

In column 11, line 15, delete "T2.1d=5." and insert -- T2.id=5. --, therefor.

In column 11, line 16, delete "T2.1d=5," and insert -- T2.id=5, --, therefor.

In column 11, line 18, delete "T2.1d=5." and insert -- T2.id=5. --, therefor.

In column 11, line 19, delete "T2.1d=5," and insert -- T2.id=5, --, therefor.

In column 11, line 21, delete "T2.1d=5." and insert -- T2.id=5. --, therefor.

In column 11, line 29, delete "T1.dno=T2.1d" and insert -- T1.dno=T2.id --, therefor.

In column 11, line 31, delete "T2.1d=5," and insert -- T2.id=5, --, therefor.

Signed and Sealed this  
Eighteenth Day of February, 2014

Michelle K. Lee  
*Deputy Director of the United States Patent and Trademark Office*